US007936746B2

(12) United States Patent
Michaelis et al.

(10) Patent No.: US 7,936,746 B2
(45) Date of Patent: May 3, 2011

(54) MULTIMEDIA COMMUNICATION SESSION COORDINATION ACROSS HETEROGENEOUS TRANSPORT NETWORKS

(75) Inventors: Paul Roller Michaelis, Louisville, CO (US); Roger L. Toennis, Arvada, CO (US); David S. Mohler, Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 137 days.

(21) Appl. No.: 12/406,784

(22) Filed: Mar. 18, 2009

(65) Prior Publication Data

US 2010/0239077 A1 Sep. 23, 2010

(51) Int. Cl.
*H04L 12/66* (2006.01)

(52) U.S. Cl. .................................. 370/352; 370/356

(58) Field of Classification Search .............. 370/356, 370/252, 351, 352, 419, 328; 455/90.5; 379/265, 379/88
See application file for complete search history.

(56) References Cited

U.S. PATENT DOCUMENTS

| | | | |
|---|---|---|---|
| 5,035,252 A | 7/1991 | Mondre | |
| 5,537,447 A | 7/1996 | Urbansky | |
| 5,619,514 A | 4/1997 | Smith | |
| 5,745,425 A | 4/1998 | Anderson et al. | |
| 5,859,882 A | 1/1999 | Urbansky | |
| 5,920,507 A | 7/1999 | Takeuchi et al. | |
| 6,141,788 A | 10/2000 | Rosenberg et al. | |
| 6,170,075 B1 | 1/2001 | Schuster et al. | |
| 6,243,836 B1 | 6/2001 | Whalen | |
| 6,260,071 B1 * | 7/2001 | Armistead et al. ............ 709/238 |
| 6,381,645 B1 | 4/2002 | Sassin | |
| 6,434,590 B1 | 8/2002 | Blelloch et al. | |
| 6,434,606 B1 | 8/2002 | Borella et al. | |
| 6,452,950 B1 | 9/2002 | Ohlsson et al. | |
| 6,650,637 B1 | 11/2003 | Bansal et al. | |
| 6,690,675 B1 * | 2/2004 | Kung et al. ................... 370/401 |
| 6,763,226 B1 * | 7/2004 | McZeal, Jr. ................. 455/90.2 |
| 6,769,027 B1 | 7/2004 | Gebhardt et al. | |
| 6,823,047 B1 * | 11/2004 | Cruickshank ............. 379/88.18 |
| 6,845,129 B2 | 1/2005 | Golin | |
| 6,862,298 B1 | 3/2005 | Smith et al. | |
| 6,879,582 B1 | 4/2005 | Dhara et al. | |
| 6,914,964 B1 | 7/2005 | Levine | |
| 6,977,948 B1 | 12/2005 | Chennubhotla et al. | |
| 7,203,193 B2 | 4/2007 | Hoof | |
| 7,215,959 B2 | 5/2007 | Creamer et al. | |
| 7,293,176 B2 | 11/2007 | Otway et al. | |
| 7,352,766 B2 | 4/2008 | Van Asten et al. | |
| 7,359,979 B2 | 4/2008 | Gentle et al. | |

(Continued)

FOREIGN PATENT DOCUMENTS

DE 102006027708 2/2008

(Continued)

OTHER PUBLICATIONS

U.S. Appl. No. 12/486,605, filed Jun. 17, 2009, Michaelis, et al.

(Continued)

*Primary Examiner* — Thong H Vu
(74) *Attorney, Agent, or Firm* — Sheridan Ross P.C.

(57) ABSTRACT

The present invention, in one embodiment, is directed to the use of a communication pathway traversing a digital telephone network to handle a portion of the signaling traffic associated with a communication method performed over the Internet.

9 Claims, 2 Drawing Sheets

U.S. PATENT DOCUMENTS

| | | | |
|---|---|---|---|
| 7,385,985 B2 | 6/2008 | Narsinh et al. | |
| 7,386,115 B2 * | 6/2008 | Peters | 379/265.09 |
| 7,418,002 B2 | 8/2008 | Robotham et al. | |
| 7,496,750 B2 * | 2/2009 | Kumar et al. | 713/154 |
| 7,626,994 B2 * | 12/2009 | Bennett | 370/419 |
| 7,627,097 B2 * | 12/2009 | Kawabata et al. | 379/100.12 |
| 7,702,947 B2 * | 4/2010 | Peddada | 714/4 |
| 2001/0028634 A1 | 10/2001 | Huang et al. | |
| 2002/0073208 A1 | 6/2002 | Wilcock et al. | |
| 2002/0101853 A1 | 8/2002 | Siegrist et al. | |
| 2003/0163328 A1 | 8/2003 | Rambo et al. | |
| 2003/0198218 A1 * | 10/2003 | Farris et al. | 370/356 |
| 2004/0057445 A1 | 3/2004 | LeBlanc | |
| 2004/0120309 A1 | 6/2004 | Kurittu et al. | |
| 2004/0233898 A1 | 11/2004 | Otsuka et al. | |
| 2005/0074008 A1 | 4/2005 | Herledan et al. | |
| 2005/0094618 A1 | 5/2005 | Colban et al. | |
| 2005/0249146 A1 * | 11/2005 | Pinault et al. | 370/328 |
| 2006/0007915 A1 * | 1/2006 | Frame | 370/352 |
| 2006/0062371 A1 | 3/2006 | Vanderheiden et al. | |
| 2006/0083199 A1 | 4/2006 | Yang | |
| 2006/0126667 A1 | 6/2006 | Smith et al. | |
| 2006/0166716 A1 * | 7/2006 | Seshadri et al. | 455/575.2 |
| 2006/0203805 A1 | 9/2006 | Karacali-Akyamac et al. | |
| 2006/0233158 A1 | 10/2006 | Croak et al. | |
| 2006/0251051 A1 | 11/2006 | Bhatt et al. | |
| 2006/0256772 A1 | 11/2006 | Yarlagadda | |
| 2006/0277051 A1 | 12/2006 | Barriac et al. | |
| 2007/0026852 A1 | 2/2007 | Logan et al. | |
| 2007/0081460 A1 | 4/2007 | Karacali-Akyamac et al. | |
| 2007/0110034 A1 * | 5/2007 | Bennett | 370/352 |
| 2007/0147399 A1 | 6/2007 | Deng et al. | |
| 2007/0167156 A1 | 7/2007 | Hundal | |
| 2007/0177579 A1 | 8/2007 | Diethorn et al. | |
| 2007/0183323 A1 | 8/2007 | Hannu et al. | |
| 2007/0211704 A1 | 9/2007 | Lin et al. | |
| 2007/0223467 A1 | 9/2007 | Makiuchi et al. | |
| 2007/0291733 A1 | 12/2007 | Doran et al. | |
| 2008/0002689 A1 * | 1/2008 | Vera | 370/389 |
| 2008/0013528 A1 | 1/2008 | Miller et al. | |
| 2008/0165708 A1 | 7/2008 | Moore et al. | |
| 2008/0205377 A1 * | 8/2008 | Chao et al. | 370/351 |
| 2008/0232353 A1 | 9/2008 | Vafin et al. | |
| 2008/0240004 A1 | 10/2008 | Shaffer et al. | |
| 2008/0285599 A1 | 11/2008 | Johansson et al. | |
| 2008/0298336 A1 | 12/2008 | Gollamudi | |
| 2008/0298349 A1 | 12/2008 | Beightol et al. | |
| 2009/0074012 A1 | 3/2009 | Shaffer et al. | |
| 2009/0213837 A1 * | 8/2009 | Ku et al. | 370/352 |
| 2009/0235329 A1 | 9/2009 | Chavez et al. | |
| 2010/0165857 A1 * | 7/2010 | Meylan et al. | 370/252 |

FOREIGN PATENT DOCUMENTS

| | | |
|---|---|---|
| EP | 0152251 | 8/1985 |
| EP | 1471708 | 10/2004 |
| EP | 1515506 | 3/2005 |
| EP | 1681844 | 7/2006 |
| EP | 1729490 | 12/2006 |
| EP | 2014020 | 1/2009 |
| EP | 2056640 | 5/2009 |
| WO | WO 98/44693 | 10/1998 |
| WO | WO 99/41876 | 8/1999 |
| WO | WO 2007/124577 | 11/2007 |
| WO | WO 2007/131296 | 11/2007 |

OTHER PUBLICATIONS

U.S. Appl. No. 12/430,697, filed Apr. 27, 2009, Michaelis, et al.
U.S. Appl. No. 12/426,023, filed Apr. 17, 2009, Michaelis, et al.
U.S. Appl. No. 12/433,334, filed Apr. 30, 2009, Brinkmann, et al.
U.S. Appl. No. 12/548,271, filed Aug. 26, 2009, Michaelis, et al.
U.S. Appl. No. 12/361,950, filed Jan. 29, 2009, Michaelis, et al.
U.S. Appl. No. 12/371,065, filed Feb. 13, 2009, Michaelis, et al.
Azuri, "Edgewater Networks, Inc. Announces Extension of VoIP Failover Capabilities at the Enterprise Edge", http://74.125.95.104/search?q=cache:JgCKutpPN7gJ:voipservices.tmcnet.com/feature/article, Nov. 16, 2007, printed on Dec. 3, 2008, pp. 1-3.
Counterpath Corporation; "Network Convergence Gateway (NCG)", Internet Article printed on Nov. 25, 2008 from http://www.counterpath.com/network-convergence-gateway-ncg.html; 2 pages.
Federal Register vol. 73, No. 139 Friday, Jul. 18, 2008, "Rules and Regulations", pp. 41258-41259.
Gurock, et al., "Selecting the Right License Strategy for your Software", printed on Jul. 25, 2009, from the Internet at http://blog.gurock.com/articles/selecting-the-right-license-strategy-for-your-software, 6 pages.
"Indepth: Jitter", VoIP Troubleshooter website, available at http://www.voiptroubleshooter.com/indepth/jittersources.html, accessed on Oct. 22, 2009, pp. 1-8.
Stevenson; "F/MC Watch: MobileSTICK a Silver Lining for Mobile Operators"; Internet Article printed on Feb. 6, 2009 from http://www.voipplanet.com/solutions/article.php/3670276; 6 pages. dated Apr. 7, 2007.
Webopedia; What is jitter buffer?—A Word Definition for the Webopedia Computer Dictionary; printed from http://www.webopedia.comITERM/J/jitter_buffer.html on Mar. 10, 2009; 6 pages.
Wikipedia; "Network switching subsystem"; Internet Article printed on Feb. 6, 2009 from http://en.wikipedia.org/wiki/Home_Location_Register; 10 pages.
Wikipedia; "Subscriber Identity Module"; Internet Article printed on Feb. 6, 2009 from http://en.wikipedia.org/wiki/Subscriber_Identity_Module; 8 pages.
Wikipedia; Jitter—From Wikipedia, the free encyclopedia; printed from http://en.wikipedia.org/wiki/Jitter on Mar. 10, 2009; 6 pages.
Wikipedia "H.323", http://en.wikipedia.org/w/index.php?title=H.323&printable=yes, Dec. 18, 2008, 14 pages.
Wikipedia "RTP Control Protocol"; http://en.wikipedia.org/w/index.php?title=RTP_Control_Protocol&pr... Jan. 9, 2009, 3 pages.
Wikipedia "Voice over Internet Protocol"; http://en.wikipedia.org/wiki/Voice_over_Internet_Protocol Jan. 23, 2009, 15 pages.
Wikipedia "H.245"; http://en.wikipedia.org/wiki/H.245 Nov. 9, 2009, 1 page.
Hahn N: "Dialog Via Internet Call Center" Nachrichtentechnik Elektronik, VEB Verlag Technik. Berlin, DE, vol. 48, No. 4, Jul. 1, 1998 pp. 17-19, XP000784128, ISSN: 0323-4657.
Search Report for UK Patent Application No. GB0917024.2, mailed Jan. 21, 2010.

* cited by examiner

MULTIMEDIA COMMUNICATION SESSION COORDINATION ACROSS HETEROGENEOUS TRANSPORT NETWORKS

FIELD

The invention relates generally to session management and particularly to coordination of session management over plural heterogeneous networks.

BACKGROUND

In the last decade, there has been an explosive growth in the number and variety of non-telephony telecommunication communication pathways available to businesses and consumers. Examples include instant messaging, and browser-based approaches, such as Internet chat and two-way video. Because these are non-telephony Internet implementations, they are missing many of the benefits of the control, coordination, and signaling functions that are present in telephone networks.

Many problems are created by the absence of a unifying control, coordination, and signaling mechanisms for non-telephony Internet-based telecommunication. An obvious problem is that, because there is no linkage among the different telecommunication methods (examples of which include instant messaging, web chat, social networks, Short Message Service ("SMS") applications, web-based video conferencing, and "Twitter") and signaling and bearer traffic use different communication paths, users are burdened with needing to track manually and synchronize the use of the different methods. Tracking and synchronizing include coordinating the simultaneous use of different independent communication pathways, each of which may identify the other parties by a different method-specific address.

Other problems arise with Internet-based telecommunication solutions because of the need to traverse heterogeneous networks across secure/managed network boundaries. A very broad variety of equipment and practices are used to build the Internet itself and also inter-network the Internet with and among the millions of the private intranets owned by companies, governments, and private citizens.

One problem is known as the Network Address Translation ("NAT") traversal problem. As will be appreciated, "NAT" refers to an Internet standard that enables a Local Area Network ("LAN") to use one set of IP addresses for internal traffic and a second set of addresses for external traffic. A NAT box located where the LAN meets the Internet makes all necessary IP Address translations. NAT serves three main purposes, namely to provide a type of firewall by hiding internal IP addresses, enable a company to use more internal IP addresses, and allow a company to combine multiple Integrated Services Digital Network ("ISDN") connections into a single Internet connection. The inability of each session participant to know the internal IP addresses of the other participants can complicate session creation, management, and coordination.

Another problem arises from firewall restrictions. A firewall is a system designed to prevent unauthorized access to or from a private network. Firewalls can be implemented in both hardware and software, or a combination of both. Firewalls are frequently used to prevent unauthorized Internet users from accessing virtual private networks connected to the Internet, especially intranets. All messages entering or leaving the intranet pass through the firewall, which examines each message and blocks those that do not meet the specified security criteria. Common firewall techniques include packet filters (which examine each packet entering or leaving the network and accept or reject it based on user-defined rules), application gateways (which apply security mechanisms to specific applications, such as File Transfer Protocol ("FTP") and Telnet servers), circuit-level gateways (which apply security mechanisms when a Transport Control Protocol ("TCP") or User Datagram Protocol ("UDP") connection is established), and proxy servers (which intercept all messages entering and leaving the network and effectively hides the true network addresses (such as by NAT)). Firewall restrictions may permit bearer traffic to pass from the Internet to the intranet but block control signaling traffic for the same session. Even when the firewall permits control signaling to pass, the latency required for the firewall to inspect and clear each packet can unacceptably disrupt real time sessions, such as instant messaging.

The result of all this heterogeneity, coupled with the firewall restrictions that are present in many network boundaries, is the near impossibility of being able to guarantee that a communication mechanism, that uses solely the Internet for signaling and bearer/media transport, will work reliably across multiple network boundary crossings independent of where it is connected to the broader global network.

SUMMARY

These and other needs are addressed by the various embodiments and configurations of the present invention. The present invention is directed generally to the use of a communication pathway over a digital telephone network to handle signaling in connection with a session performed over the Internet.

In a first embodiment, a method includes the steps:

(a) receiving, from a first user at a first endpoint, a request to communicate, by a selected communication method, with a second user at a second endpoint, wherein communication between the first and second endpoints is possible by a digital telephone network and a data network;

(b) in response, establishing a first communication pathway between the first and second endpoints over the digital telephone network, wherein the first and second endpoints exchange, over the first communication pathway, selected information respecting the selected communication method; and (c) while the first communication pathway is enabled (active), conducting a communication session, over a second communication pathway extending between the first and second endpoints and traversing the data network, wherein, in the communication session, the first and second endpoints exchange, over the second pathway and by the selected communication method, media information.

The selected communication method includes, for example, instant messaging, web chat, social networking, short message service, web-based video conferencing, Voice over Internet Protocol, application sharing, Voice over Instant Messaging, and Twitter.

The selected information includes, for example, an endpoint's telephone number and electronic address on the data network, an identifier of a type of the communication method, a Universal Resource Indicator ("URI") associated with the selected communication method, authentication information, media type to be supported by the second pathway, encryption algorithm and an encryption key to be applied to selected communications on the second pathway, compression algorithm to be applied to selected communications on the second pathway, Quality of Service ("QoS") to be realized for communications on the second pathway, and network resources to be used for the second pathway.

The media information comprises media communications, by the selected communication method, between the first and second users. The media may be of any form and type, such as one or more of audio, video, text, still images, animation, and interactivity content forms.

In another embodiment, a method includes the steps:

(a) establishing, by a processor, a first communication pathway between first and second endpoints over a digital telephone network; and (b) performing, by the processor one or more of the following sub-steps:

(B1) in response to a request received over the first communication pathway, requesting that a security gateway port be opened and determining whether a test signal transmitted by the second endpoint passed through the port;

(B2) negotiating, by messages sent over the first communication pathway, a failover strategy, in the event of a failover triggering event, for a subsequent Voice over Internet Protocol communication between the first and second endpoints; and (B3) exchanging, between the first and second endpoints and over the first communication pathway, encryption keys, the encryption keys to be used for at least one of a second communication pathway traversing the Internet and for validating a license.

The present invention can provide a number of advantages depending on the particular configuration. By way of example, the invention can provide a control, coordination, and signaling mechanism for non-telephony Internet-based telecommunication. The mechanism can leverage the existing North American Numbering Plan ("NANP") and the International Telephony Union's ("ITU") E.164 standard to represent a reliable and regulated "communication session" identification and control mechanism that is re-purposed for use in Internet-based communications technologies and solutions. The mechanism can flexibly bifurcate the content of a multi-element communication session for transport across multiple network transport paths, one of which is a digital telephone network and the other of which is the Internet. In this manner, the mechanism can overcome the problems associated with Internet Protocol network firewalls that block the transmission of signaling data. Existing telephony protocols permit both control signaling and media information to be transmitted. The mechanism can provide control signaling to each endpoint without undue increases in packet latency, as would be introduced by virus inspecting security applications. The mechanism can also provide an effective way to implement a federated network across heterogeneous networks, which include security gateways.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "communication pathway" refers to a unidirectional or bidirectional connection between network nodes. A communication pathway may have one or more channels.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The terms "online community", "e-community", or "virtual community" mean a group of people that primarily interact via a computer network, rather than face to face, for social, professional, educational or other purposes. The interaction can use a variety of media formats, including wikis, blogs, chat rooms, Internet forums, instant messaging, email, and other forms of electronic media. Many media formats are used in social software separately or in combination, including text-based chatrooms and forums that use voice, video text or avatars.

The term "social network service" is a service provider that builds online communities of people, who share interests and/or activities, or who are interested in exploring the interests and activities of others. Most social network services are web-based and provide a variety of ways for users to interact, such as e-mail and instant messaging services.

The terms "social network" and "social networking" refer to a web-based social network or interpersonal interactions effected by a social network, respectively.

"Twitter" is a social networking and micro-blogging service that allows its users to send and read other users' updates (otherwise known as tweets), which are text-based posts of up to 140 characters in length. Updates are displayed on the user's profile page and delivered to other users who have signed up to receive them. Senders can restrict delivery to those in their circle of friends (delivery to everyone being the default). Users can receive updates via the Twitter website, SMS, RSS, or through applications such as TwitterMobile, Tweetie, Twinkle, Twitterrific, Feedalizr, Facebook, and Twidget, a widget application.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
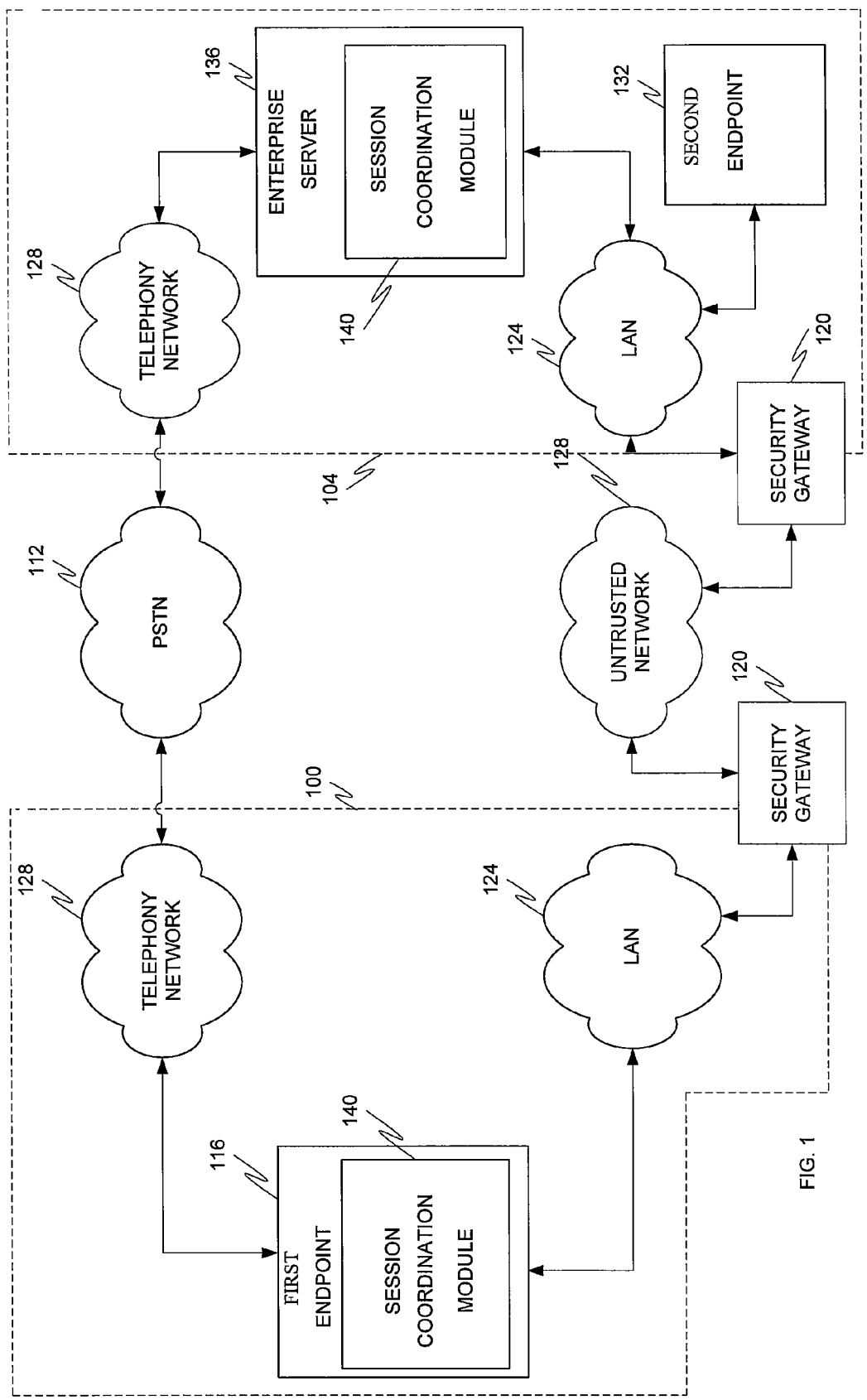
FIG. 1 is a block diagram of a network architecture according to an embodiment.

FIG. 1 depicts a network architecture according to one embodiment. The architecture includes first and second enterprise networks 100 and 104 separated by an un-trusted network 108 (which is a packet-switched wide area un-trusted or public distributed processing or data network such as the Internet) and a digital telephone network 112 (such as a cellular network and/or the Public Switched Telephone Network ("PSTN")). The first enterprise network 100 includes a first endpoint 116, a security gateway 120, a LAN (or trusted network) 124 interconnecting the first endpoint 116 and security gateway 120, and a telephony network 128. The second enterprise network 104 includes a second endpoint 132, security gateway 120, enterprise server 136, all interconnected by LAN 124, and a telephony network 128.

The dotted lines 100 and 104 surrounding each of the local area networks and its nodes indicate the De-Militarized Zone ("DMZ"), or demarcation zone or perimeter network. As will be appreciated, the DMZ is a physical or logical sub-network that contains or exposes an organization's external services to a larger, un-trusted network, such as the Internet. It provides an added layer of security to the organization's local area network, whereby an external attacker only has access to equipment in the DMZ rather than the entire local area network. Any service provided to external users in an external network are placed in the DMZ, particularly web servers, mail servers, FTP servers, VoIP servers, and DNS servers.

The first and second endpoints, or communication devices, 116 and 132 are circuit- and/or packet-switched computational components, such as personal computers, laptops, personal digital assistants, wired or wireless phones, and other devices for presenting information to and receiving input from a subscriber to the respective enterprise network 104. Preferably, the endpoints are able to engage in communication methods in addition to live voice communications. More preferably, each of the endpoints is equipped with a web browser. Exemplary communication devices include the 1600, 2400, 4600, 5400, and 5600 Series™ digital telephones, 9610 and 9620™ IP telephones, and IP Softphone™ of Avaya, Inc., operating on a personal computer, laptop or notebook computer.

The security gateways 120 allow or control access to a network. The gateway, also called a protocol converter, is equipped for interfacing with another network that uses different protocols. The gateway can contain devices such as protocol translators, impedance matching devices, rate converters, fault isolators, and signal translators, as necessary, to provide system interoperability. The gateway can further include security applications, such as a firewall configured to permit, deny, encrypt, decrypt, or proxy all computer traffic between different security domains based upon a set of rules and other criteria. The gateway 120 may, or may not, be configured to pass control signalling or bearer traffic and further may, or may not, be user reconfigurable in response to commands received over the respective LAN.

The enterprise server 136 is a software-controlled device containing programs that collectively serve the communication needs of the respective enterprise. For example, it can include PBX (private branch exchange) functionality and provide other telecommunications features. The PBX functionality acts as a digital or Voice over Internet Protocol ("VoIP") telephone system within the enterprise and switches calls between enterprise users on local lines while allowing all users to share a certain number of external phone lines. The server 136 can also provide subscribers with multimedia communication applications, such as instant messaging, web chat, social networks, SMS, web-based video conferencing, and Twitter. Exemplary enterprise servers include the S8300™, S8500™, S8510™, S8710™, S8720™, and S8730™ media servers from Avaya, Inc. The server 136 can include various adjuncts to provide desired telecommunication features. For example, the server 136 can include adjuncts to provide VoIP functionality, such as the C360™ and X330™ switches from Avaya, Inc.

The telephony networks 128 can include a variety of components for establishing wireless and or wired digital telecommunication connections, including one or more telephone trunk (multiple phone) lines, media servers, switches (e.g., a PBX), wireless telephone network access points such as AP-7™ and AP-8™ from Avaya, Inc., media gateways (such as the G150™, G250™, G350™, G450™, G600™, G650™, G700™, and the G860™ port networks and the Integrated Gateway™ from Avaya, Inc.).

Each of the first and second enterprise networks 100 and 104 includes, in memory, a session coordination module 140, which, when executed by a processor, effects session creation, management, and coordination for telecommunication methods, such as instant messaging, web chat, social networking, SMS, web-based video conferencing, VoIP, VoIM, application sharing applications (e.g., Webex™ and Meeting Exchange™ by Avaya, Inc.), and Twitter, all of which require the bearer communication pathway to transit across the un-trusted network 108. In one exemplary configuration, the module 140 effects, for a communication session between the first and second endpoints, separation of the control signaling and bearer communication pathways over a cellular network and an Internet connection, respectively. The control signaling includes any signaling to set up, manage, and tear down the session, such as session (parameter) negotiation signaling (e.g., signaling regarding compression levels (e.g., codec standard to be employed), media types and/or packet-switched communication pathways to be used, applications to be used, and other session parameters), security (e.g., security protocols and encryption parameters (symmetrical or asymmetrical keys and encryption algorithms) to be used), authentication (e.g., digital certificate exchanges), gateway configurations, session updates (e.g., changes in session parameters and media types), and the like). Using the digital telephony network for carrying a portion of the control signaling, the module 140 automatically initiates an appropriate bearer communication pathway session over the un-trusted network that uses common web transport protocols, such as the hypertext transfer protocol ("http"), that would carry bearer traffic between parties involved in the communication session.

Session coordination is performed by pairing the telephone address associated with the module with an IP address of a corresponding session endpoint receiving the bearer traffic. As will be appreciated, the telephone numbers are defined by a suitable standard, such as the North American Numbering Plan ("NANP") and the International Telephony Union's ("ITU") E.164 standard. Using the pairing of telephone address/IP address for each endpoint, control signals for a session can be associated by the module 140 with a bearer communication pathway and the appropriate action taken by the module 140 in response to the control signal.

In one configuration, the telephone number/IP address pairing is determined by converting the telephone address into a corresponding IP address according to the Electronic NUMbering ("ENUM") protocol (or ITU E.164 standard). The ENUM protocol from the IETF converts a telephone number to an IP address and vice versa so that it can be resolved by the Internet's DNS system like traditional Web site domains. For example, the fully qualified telephone number 1-215-555-1234 would turn into 4.3.2.1.5.5.5.5.1.2.1.e164.arpa. The digits are reversed because DNS reads right to left (the top level domain such as .com in a URL is read first). ENUM records can hold attributes about a device such as whether it can receive a text message or is Internet capable.

Figure 2:
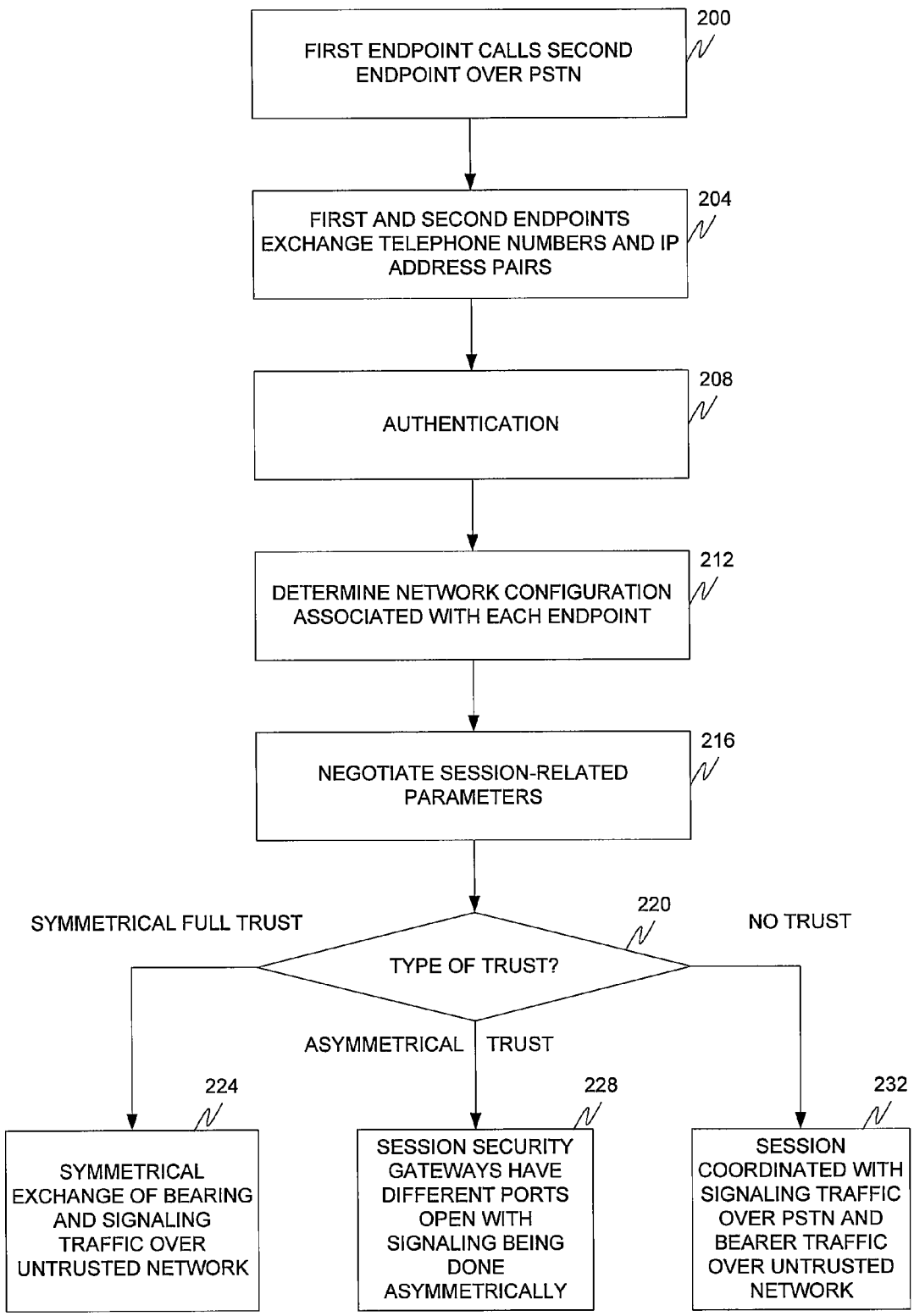
FIG. 2 is a flow chart according to an embodiment.

The operation of the module 140 will now be described with reference to FIG. 2.

In step 200, the first endpoint 116 calls the second endpoint 136 over the digital telephone network 112. This would be initiated by a user of the first endpoint 116 selecting a communication method and providing an electronic address (e.g., telephone number, IP address, instant message handle, and the like) or name associated with a user of the second endpoint 136. In response, the module 140 determines the corresponding telephone number (e.g., NANP and E.164) of the second endpoint 136 and initiates the call. The call set up signal, such as an invite defined by the Session Initiation Protocol or ("SIP"), may include in its header or payload a unique identifier indicating that the call is to be used as a control signaling communication pathway for a communication method. The identifier may further indicate the type of communication method for which the control signaling communication pathway is to be used. In other words, each type of communication method would have a corresponding, unique identifier.

The session coordination module 140 in the enterprise server 136 receives the incoming call and, by the identifier, identifies the call as a request to open up a control signaling communication pathway over the digital telephone network 112. In the case of an incoming session setup request, the second endpoint user (call recipient) receives, from the module 140, a popup user interface on the display of the second endpoint showing the NANP caller identifier of the user (call originator) of the first endpoint and presented with options to "Accept Call" or "Decline Call". If the recipient selects the former option, a call answered message, or an OK message in SIP, is sent back over the digital telephone network 112, and a live Internet-based session starts for both the call originator and call recipient. If the recipient selects the latter option, a call declined message is sent back over the digital telephone network 112, and no Internet session is started.

When the recipient accepts the call, the modules 140, in step 204, exchange the telephone numbers and (internal) IP addresses of each module's corresponding endpoint. As will be appreciated, the internal IP address is the IP address of the endpoint in the absence of network address translation. The addresses permit the module to determine that any media arriving from a first phone number of the first endpoint and any media coming from a first IP address of the first endpoint are both coming from a common source. Also as part of the initial session setup, a unique Universal Resource Indicator ("URI") is exchanged between the modules 140 positioned at both ends of the control signaling communication pathway. The URI is populated automatically into a web browser, applet, or application instance running on the respective endpoint or, alternatively, running on an embedded software program running on the communication method itself. After control signals are exchanged and bearer session setup completed, the endpoints will both go to the common URI to communicate with one another by the selected communication method. The URI resolves to an IP address of an application server. A unique session identifier may be provided by each endpoint to permit the application server to match the media streams from each endpoint with the other endpoint.

After call setup is completed, the modules 140, in step 208, authenticate one endpoint to the other endpoint. Any suitable authentication technique may be employed, with Public Key Infrastructure ("PKI") being preferred. PKI uses an asymmetric public and a private cryptographic key pair that is obtained and shared through a trusted authority. The public key infrastructure provides for a digital certificate that can identify an individual or an organization and directory services that can store and, when necessary, revoke the certificates. Authentication techniques using symmetric keys may also be employed.

In step 212, after authentication is completed successfully, each of the modules 140 determine the network configuration associated with each module's respective gateway 120. In one configuration, the gateway's port configuration may be determined using the Simple Traversal of UDP through NAT ("STUN") protocol. As will be appreciated, STUN is a protocol that allows applications to detect that a network address translation (NAT) is being used. It can also detect the type of NAT and IP address assigned by it. STUN was developed to support interactive, two-way communications over the Internet such as for voice (VoIP) and videoconferencing. The STUN client sends requests to a STUN server, which is typically hosted by the service provider. In another configuration, the port configuration is probed by the module 140 within the premises protected by the gateway 120. Probing includes sending a request to the gateway to open up a specified port followed by an attempt by the external endpoint to send a transmission through the allegedly opened port to the internal IP address associated with the other endpoint (protected by the gateway). The precise port to be tested is determined by an exchange of signals by the modules 140 over the control signaling communication pathway. A failed transmission means that the port could not be opened. The failed transmission may be determined by an error message returned to the source or a lack of receipt of the signal by the destination. A successful transmission means that the port was opened successfully. This step, when completed, will inform the modules as to what control signaling, if any, will not pass through the gateway and therefore must be transmitted over the digital telephone network 112.

In step 216, session-related parameters are negotiated. Although many session-related parameters may be negotiated in this step, the primary parameters negotiated respect whether a signaling communication pathway is required over the digital telephone network 112 and, if so, what control signals will be passed over the signaling communication pathway. In a first situation referred to herein as "symmetrical full trust", each module is able to configure its respective gateway 120 to open up specified gateway ports for control signaling for the communication session between the first and second endpoints. In a second situation referred to herein as "asymmetrical trust", only one module is able to open a gateway port for control signals and the other is not. Thus, control signals can be passed reliably over the un-trusted network in one direction only; that is, from the un-trusted network through the specified, open port. For this reason, control signals being transmitted in the other direction are carried by the digital telephone network 112. In a third situation referred to herein as "no trust", neither module is able to open a gateway port for control signals. Thus, control signals cannot be reliably transmitted over the un-trusted network. Accordingly, all control signals are transmitted over the digital telephone network 112.

Another parameter that may be negotiated over the digital telephone network is the communication session failover strategy. Both modules 140 can exchange their respective default failover strategies. A failover strategy, for example, is that, in the event of an intermediate node or link malfunction or unacceptably low Quality of Service or Grade of Service, the bearer communication pathway is moved from the data network to the PSTN. If default failover strategies differ between enterprise networks, the modules 140 can negotiate a common failover strategy to employ upon the occurrence of a failover triggering event. This ability to negotiate failover strategies for the control signaling and/or bearer communication pathways can provide a high level of sophistication and flexibility. Different types of sessions or the same types of session but involving different endpoints can have differing failover strategies. For example, a first type of session or communication method can have a first failover strategy (or communication pathway), and a second (different) type of session or communication method can have a second (different) failover strategy (or communication pathway). Likewise, a set of endpoints in the first and second enterprise networks can have a first failover strategy (or communication pathway), and a second (different) set of endpoints in the first and second enterprise networks can have a second (different) failover strategy (or communication pathway). The failover strategy could be that no failover is to be performed after occurrence of a failover triggering event provided that one party has failed to respond within a determined period of time to a communication from the other party. The modules 140 would assume that the lack of timely response indicates that the party is no longer interested in continuing the session.

Another parameter that can be negotiated is security. The modules 140 can, for example, decide that the URI (feature) server (not shown) shall exclude any contactor attempting to visit the common URI when the contactor is not identified as the first or second endpoint. This would prevent attackers from attacking the session.

Other session-related parameters that can be negotiated include media type to be supported in the session (e.g., audio, video, text, still images, animation, and interactivity content forms), encryption technique and parameters (e.g., key exchange, encryption algorithm or cipher, and digital signature), compression technique and parameters (e.g., codec specification and options), QoS parameters (e.g., jitter, latency, and packet loss), GoS parameters, specific communication pathways to be used, and network resource consumption (e.g., bandwidth required).

The digital telephone network, in one configuration, is used, as a secure communication pathway, to exchange symmetric, or secret, keys for use in establishing secure sessions conducted over the un-trusted network. The key provision may also be used to validate a license, such as a vendor license for software.

In decision diamond 220, the modules 140 determine the type of trust relationship to be used for the session. Box 224 denotes symmetrical full trust in which there is a symmetrical exchange of all bearing and all signaling traffic over the un-trusted network 108. On each gateway, the bearer and signaling traffic typically pass through different ports. In this case, the signaling pathway over the digital telephone network 128 is disconnected after port configuration of the security gateways to accommodate both bearer and control signaling pathways. Box 228 denotes asymmetrical trust in which only one of the session security gateways 120 has a port open for signaling traffic with signaling traffic flowing the other direction being sent asymmetrically. In other words, all of the bearer traffic passes over the un-trusted network 108 while one signaling communication pathway passes over the digital telephone network 112 (towards the gateway 120 which blocks the signaling traffic) and the other signaling communication pathway over the un-trusted network 108 (towards the gateway 120 which has been reconfigured to pass the signaling traffic). Accordingly, the channel of the communication pathway (over the digital telephone network 112) flowing in the same direction as the control signaling channel over the un-trusted network is disconnected. The channel of the communication pathway (over the digital telephone network) flowing in the other direction is kept alive. Box 232 denotes no trust in which the session is coordinated with all control signaling traffic passing over the digital telephone network 112 and all bearer traffic over the un-trusted network 108.

Both the signaling and bearer sessions remain alive during the call. The subsequent bearer/media, of any and all types, that gets exchanged between the users of the first and second endpoints 116 and 136 would pass over the bearer communication pathways crossing the un-trusted network 108. During this entire time, there would be both the active telephony session over the digital telephone network 112 and an active un-trusted network (e.g., Internet) https bearer session that are coordinated; that is, the control signals would be mapped to and control the bearer session.

When either the originator or recipient disconnects the control signaling session by hanging up, both the https bearer session and cellular signaling session would be disconnected in concert. In one configuration, there will be accurate Call Detail Record ("CDR") records of the call from the cellular operator linking the signaling and media information related to the call.

In one application, when there is no connection available over the un-trusted network 108 the modules 140 would automatically attempt to use cellular data capability, such as 2.5G and 3G, to set up the bearer traffic over the digital telephone network 112. When the cellular connection happens to be a 1G or 2G connection, in-band or out-of-band Dual Tone Multi-Frequency ("DTMF") touch-tones or other low-bandwidth tones would be used.

When an enterprise server is positioned at either end of the call, the connection over the digital telephony network 112 may be kept alive and cached after the parties have ceased using the connection for control signaling. The persistency of this connection permits the connection to be used at different times by the same or other endpoints in the enterprise networks at each end of the connection. Caching the connections can reduce the time and processing resources needed to establish the connection.

The exemplary systems and methods of this invention have been described in relation to communication session coordination and management. To avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server or endpoint, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention are implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:
   (a) establishing, by a processor, a first communication pathway between first and second endpoints over a digital telephone network; and
   (b) performing, by the processor, at least one of the following sub-steps:
   (B1) in response to a request received over the first communication pathway, requesting that a security gateway port be opened and determining whether a test signal transmitted by the second endpoint passed through the port;
   (B2) negotiating, by messages sent over the first communication pathway, a failover strategy, in the event of a failover triggering event, for a subsequent Voice over Internet Protocol communication between the first and second endpoints; and
   (B3) exchanging, between the first and second endpoints and over the first communication pathway, encryption keys, the encryption keys to be used for at least one of a second communication pathway traversing the Internet and for validating a license.

2. The method of claim 1, wherein sub-step (B1) is performed.

3. The method of claim 1, wherein sub-step (B2) is performed, wherein a first failover strategy for the first and second endpoints in first and second enterprise networks, respectively, differs from a second failover strategy for third and fourth endpoints in the first and second enterprise networks, respectively.

4. The method of claim 1, wherein sub-step (B3) is performed.

5. A Non-transitory computer readable medium comprising processor executable instructions to perform the steps of claim 1, wherein the computer readable medium is connected to and accessible by a processor.

6. A system, comprising:
   a processor operable to:
   (a) establish a first communication pathway between first and second endpoints over a digital telephone network; and
   (b) perform at least one of the following sub-steps:
   (B1) in response to a request received over the first communication pathway, request that a security gateway port be opened and determining whether a test signal transmitted by the second endpoint passed through the port;
   (B2) negotiate, by messages sent over the first communication pathway, a failover strategy, in the event of a failover triggering event, for a subsequent Voice over Internet Protocol communication between the first and second endpoints; and
   (B3) exchange, between the first and second endpoints and over the first communication pathway, encryption keys, the encryption keys to be used for at least one of a second communication pathway traversing the Internet and for validating a license.

7. The system of claim 6, wherein sub-operation (B1) is performed.

8. The systemd of claim 6, wherein sub-operation (B2) is performed, wherein a first failover strategy for the first and second endpoints in first and second enterprise networks, respectively, differs from a second failover strategy for third and fourth endpoints in the first and second enterprise networks, respectively.

9. The system of claim 6, wherein sub-operation (B3) is performed.

* * * * *